(12) United States Patent
Anderson et al.

(10) Patent No.: US 8,459,441 B2
(45) Date of Patent: Jun. 11, 2013

(54) COMPONENT HOLDBACK SYSTEM

(75) Inventors: David Anderson, Aurora, IL (US); Len Ekkert, Lemont, IL (US)

(73) Assignee: Phoenix Closures, Inc., Naperville, IL (US)

( * ) Notice: Subject to any disclaimer, the term of this patent is extended or adjusted under 35 U.S.C. 154(b) by 161 days.

(21) Appl. No.: 13/197,355

(22) Filed: Aug. 3, 2011

(65) Prior Publication Data
US 2013/0032449 A1  Feb. 7, 2013

(51) Int. Cl.
B65G 47/32  (2006.01)

(52) U.S. Cl.
USPC ............... 198/419.1; 198/463.6; 198/459.7

(58) Field of Classification Search
USPC .................. 198/419.1, 459.6, 463.6, 459.7
See application file for complete search history.

(56) References Cited

U.S. PATENT DOCUMENTS

| 1,475,469 | A | | 11/1923 | Bach |
| 2,097,383 | A | | 10/1937 | Riemer |
| 2,153,039 | A | | 4/1939 | Darling |
| 2,729,377 | A | | 1/1956 | O'Neil |
| 3,570,642 | A | | 3/1971 | Shenoha |
| 3,724,648 | A | * | 4/1973 | Schaller ................... 198/443 |
| 4,003,117 | A | | 1/1977 | Fletcher et al. |
| 4,120,393 | A | * | 10/1978 | Motooka et al. .......... 198/460.1 |
| 4,216,855 | A | * | 8/1980 | Raudat ..................... 198/633 |
| 4,250,685 | A | | 2/1981 | Elsworth |
| 4,279,115 | A | | 7/1981 | Roberts et al. |
| 4,719,739 | A | | 1/1988 | Foldesi |
| 5,070,992 | A | * | 12/1991 | Bonkowski ............... 198/419.1 |
| 5,303,811 | A | * | 4/1994 | Haley ....................... 198/419.1 |
| 6,131,372 | A | * | 10/2000 | Pruett ......................... 53/448 |
| 6,393,800 | B1 | | 5/2002 | Schwenke |
| 6,971,216 | B2 | | 12/2005 | Monti |
| 7,874,246 | B2 | * | 1/2011 | Pryor et al. ................. 99/537 |
| 8,235,200 | B2 | * | 8/2012 | Fischbacher ............. 198/419.1 |
| 2010/0038209 | A1 | * | 2/2010 | Risley .................... 198/459.7 |
| 2011/0168525 | A1 | * | 7/2011 | Vasse et al. ............. 198/419.1 |

FOREIGN PATENT DOCUMENTS

JP  01162621 A  *  6/1989  ............. 198/418.7

* cited by examiner

Primary Examiner — Mark A Deuble
(74) Attorney, Agent, or Firm — Husch Blackwell LLP

(57) ABSTRACT

A system with rotatable levers spaced and positioned to alternately retain or release components from a plurality of lanes simultaneously into slots of a component receiving mechanism. The levers may be differently sized and shaped to hold back certain components at different positions than others, or the levers may be attached to a rotatable member at varying angles to one another to accomplish such varying holdback patterns. Alternatively, a cam and pin arrangement may be utilized.

22 Claims, 11 Drawing Sheets

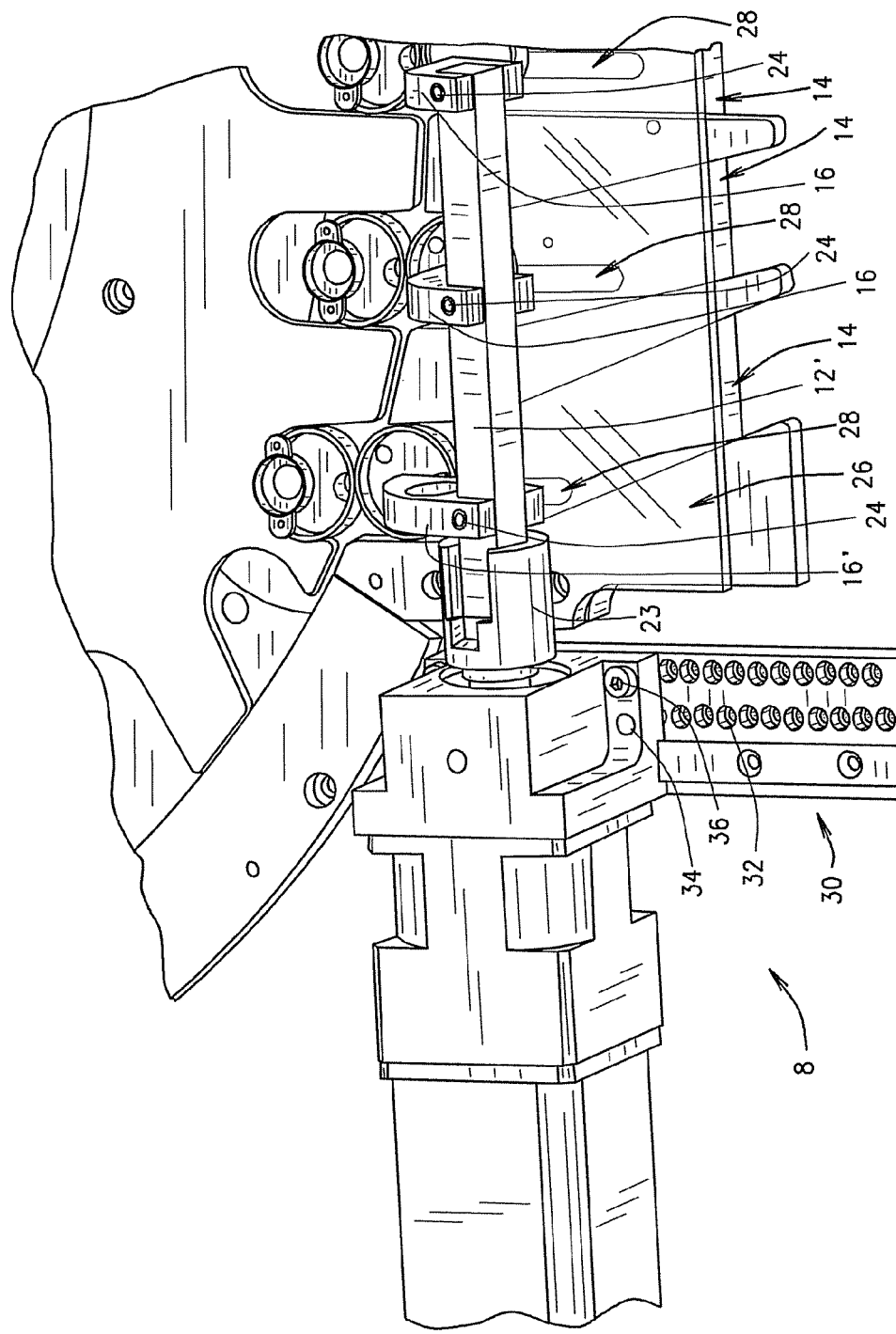

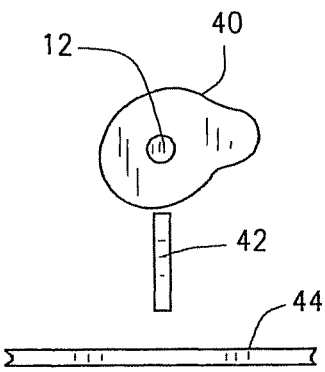
F I G . 1 1 A
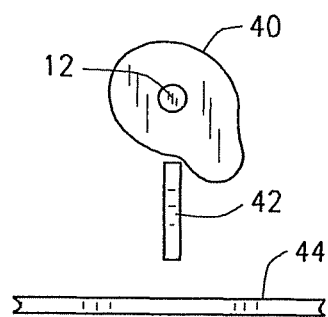
F I G . 1 1 B
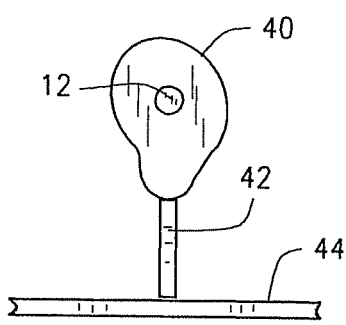
F I G . 1 1 C

COMPONENT HOLDBACK SYSTEM

BACKGROUND OF INVENTION

The present invention is directed generally to a component holdback system, and more particularly to a system with at least one rotatable or fixed in-line lever positioned to alternately retain or release components from at least one lane of such components while an operation is performed ahead of the holdback point.

Various techniques have been utilized to manage the movement and positioning of components in assembly lines. It is generally well known in the art to single line or multi-line feed lanes which feed components into various mechanisms, such as straight pockets or star wheels (or "sprockets" or "gears" or "dials") or other suitable component receiving mechanisms. Star wheels, straight pockets and other component receiving mechanisms are often used in assembly line systems to quickly transport components from one workstation to another, or to reduce a number of component in-feed streams down to a single component outflow stream. Star wheels have a plurality of cogs, with each two adjacent cogs defining a recess therebetween. Components are fed into the star wheel recesses between consecutive cogs. Conversely, whereas the recesses around a star wheel are generally radially spaced with respect to one another, straight pockets are generally aligned in a straight line with respect to one another. In both cases, the consistent and continuous in-feed of components from one or multiple lines into such mechanisms can be of high importance, as each failed insertion of a component may results in a drop in efficiency. In may cases, a broken part may be the result of improper insertion.

When feeding components into such a star wheel or a straight pocket, problems may arise. In some situations, components in the in-feed streams can crowd together and become stuck such that fewer than desired (or no) components are received by the star wheel or straight pocket. Additionally, as components are generally fed into straight pockets or into star wheels as the star wheels rotate, timing issues may hinder the proper in-feed of components. Attempting to feed a component into a component receiving mechanism too quickly or too slowly will result in a mis-feed, preventing the component from being received properly. Additionally, specifically with star wheels, when attempting to feed components into the recesses of a star wheel from multiple in-feed lanes, the natural curvature of the star wheel can create loading issues.

Therefore, a more efficient system for feeding components, such as beverage caps, into component receiving mechanisms such as a straight pocket or star wheel is desired.

SUMMARY OF INVENTION

A component receiving mechanism is provided to receive a plurality of components. The component receiving mechanism may be a straight pocket or a star wheel. It is noted that the component receiving mechanism need not be an individual machine or device such as the above mentioned star wheel or straight pocket. Instead the component receiving mechanism may be a much larger overall process or system into which components are to be fed so that an operation (e.g., movement of the components, installation of the components, modification of the components, etc.) can be performed thereon. Components will hereinafter be referred to as "caps," though it is understood that the system described herein could be used in connection with any components or parts which are or could be moved via lanes.

Caps are provided to the component receiving mechanism via one or more in-feed lanes. Each in-feed lane may be fed via a single-file feed source, or all of the in-feed lanes may be fed by a single, larger capacity feed source and divided into single-file columns prior to or by the in-feed lanes. A rotatable member extends across the in-feed lanes proximate the entrance to the component receiving mechanism, and the rotatable member is connected to a motor or other drive means designed to selectively rotate the rotatable member. At least one lever extends downwardly from the rotatable member, preferably with a single lever extending downwardly into each in-feed lane. These levers hold back the caps in each lane from proceeding forward into the entrance of the component receiving mechanism inappropriately. At the appropriate time, the motor causes the rotatable member and the attached the levers to rotate by a predetermined amount depending on the height of the cap, which in one embodiment may preferably be about 40°, such that each respective lever in each lane ceases to block the forward movement of a cap into the component receiving mechanism. Once a predetermined number of caps from each in-feed lane enter the component receiving mechanism, the motor actuates to cause the rotatable member and the attached levers to rotate back to their starting positions in order to hold back the next cap in each respective in-feed lane.

Additionally, where the component receiving mechanism is a star wheel, in order to better account for the proper feeding of caps into respective recesses in the star wheel, the levers are preferably positioned to hold back caps in a radial manner such that the cap in a lane toward the center of the in-feed lanes is held farther back than is a cap in an outer in-feed lane. This radial hold back pattern helps to account for the natural curvature of the star wheel, and allows more efficient loading of the star wheel with caps.

Specific advantages and features of the present holdback assembly will be apparent from the accompanying drawings and the description of several illustrative embodiments of the present invention.

BRIEF DESCRIPTION OF DRAWINGS

FIG. 10 is a perspective view of additional optional features of the present holdback system.

FIGS. 11A-11C illustrate a side cross sectional view of an alternative embodiment of a holdback system in which a cam and biased pins are used in place of rotating lever members.

It should be understood that the drawings are not necessarily to scale and that the embodiments disclosed herein are sometimes illustrated by fragmentary views. In certain instances, details which are not necessary for an understanding of the present invention or which render other details difficult to perceive may have been omitted. It should also be understood that the invention is not necessarily limited to the particular embodiments illustrated herein. Like numbers utilized throughout the various figures designate like or similar parts or structure.

DETAILED DESCRIPTION

Figure 1:
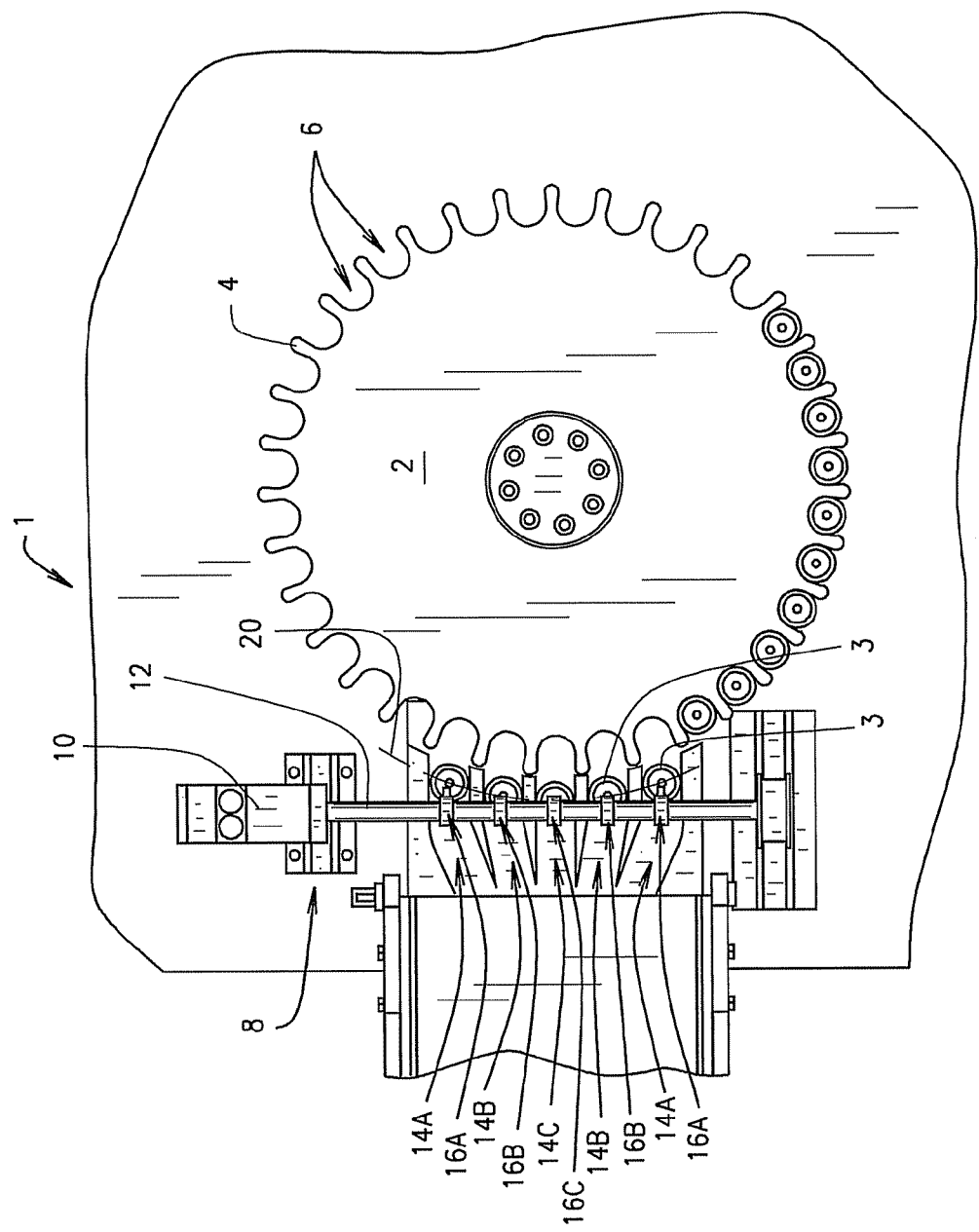
FIG. 1 is a top plan view of an embodiment of the present holdback system in use with a star wheel in accordance with the teachings of the present invention.
Figure 2:
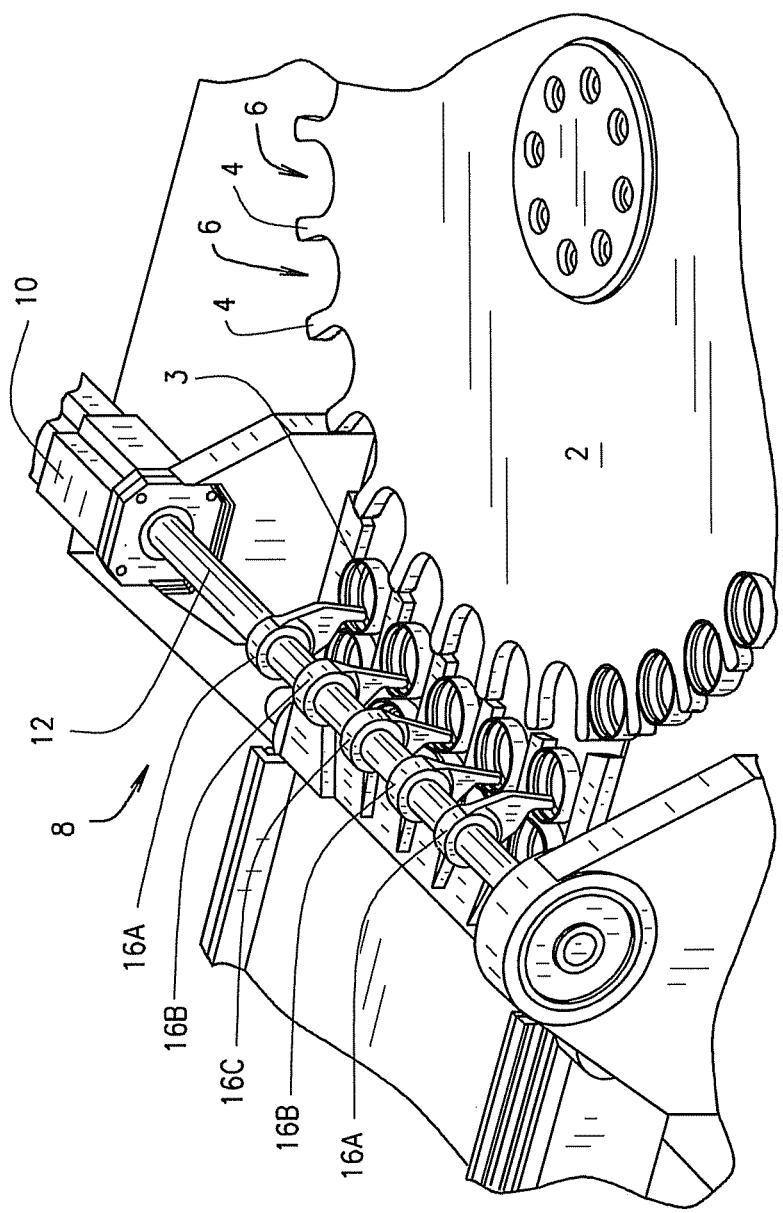
FIG. 2 is a close-up perspective view of the holdback assembly of FIG. 1, in which the levers are positioned to hold back the caps.

FIG. 1 illustrates a holdback system 1 according to an embodiment of the present invention. It should be understood that the drawings illustrate a holdback assembly 8 in use with a star wheel 2. However, as discussed above, the holdback assembly 8 may be used in connection with straight pockets or any other component receiving mechanism. The holdback assembly 8 would function essentially identically when used with a different component receiving mechanism.

Star wheel 2 includes cogs 4 and recesses 6, each pair of adjacent cogs 4 defining a recess 6. Each recess 6 of star wheel 2 are sized and shaped to receive a cap 3 therein. Holdback assembly 8 includes a motor 10, a rotatable member 12 and a set of levers 16. Each lever 16 is positioned to be rotatable into and out of a single lane 14. In FIG. 1, five such lanes 14 and levers 16 are shown, with one lever 16 rotatable into each lane 14. However, it is noted that a single lane 14 and lever 16 or any suitable number of lanes 14 and levers 16 may be used so long as at least one lever 16 is selectively positionable into each lane 14.

The five in-feed lanes 14 shown in FIG. 1 form a series having two outer in-feed lanes 14A, a central in-feed lane 14C, and two middle in-feed lanes 14B positioned between the central lane 14C and either outer lane 14A. Associated with the outer in-feed lanes 14A are two levers 16A—one such lever 16 being associated with each in-feed lane 14. Associated with the central in-feed lane 14C is lever 16C. Associated with the two middle lanes 14B are two levers 16B—again, one such lever 16 being associated with each in-feed lane 14.

Figure 3:
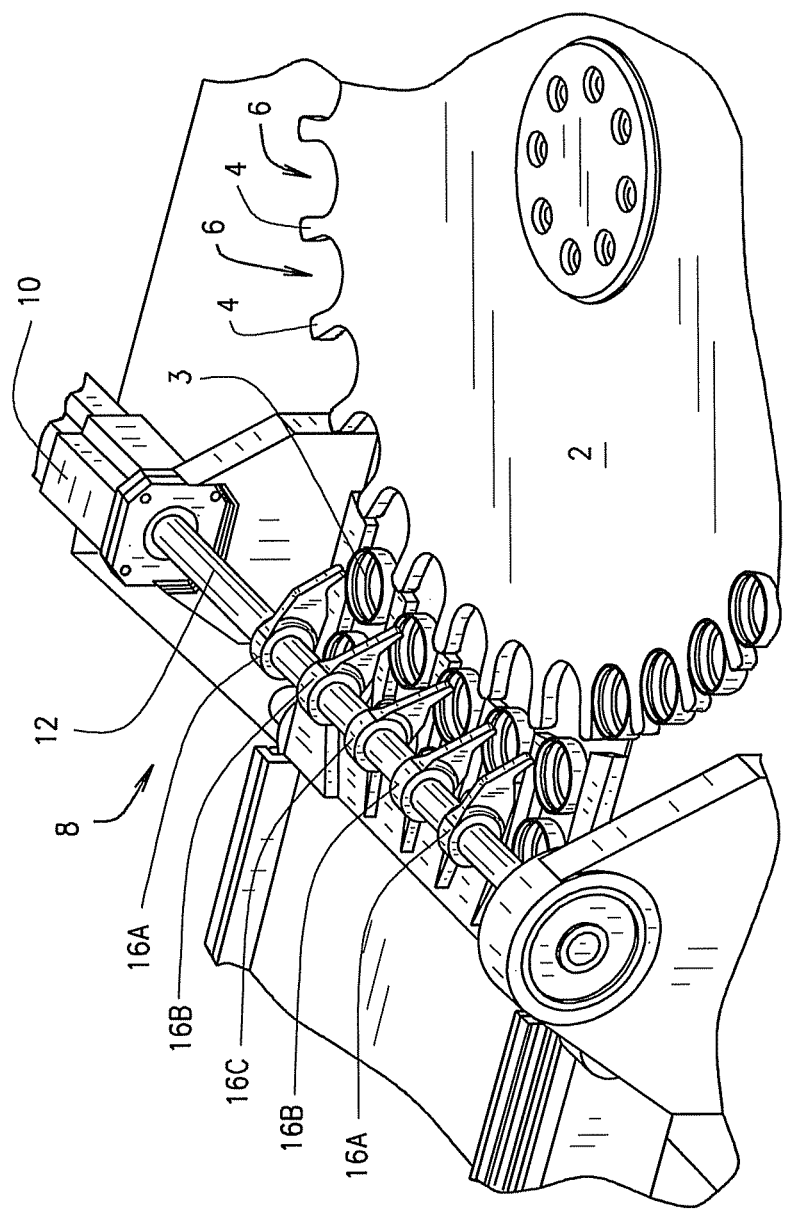
FIG. 3 is a close-up perspective view of the holdback assembly, in which the levers have rotated so as to cease holding back the caps.
Figure 4:
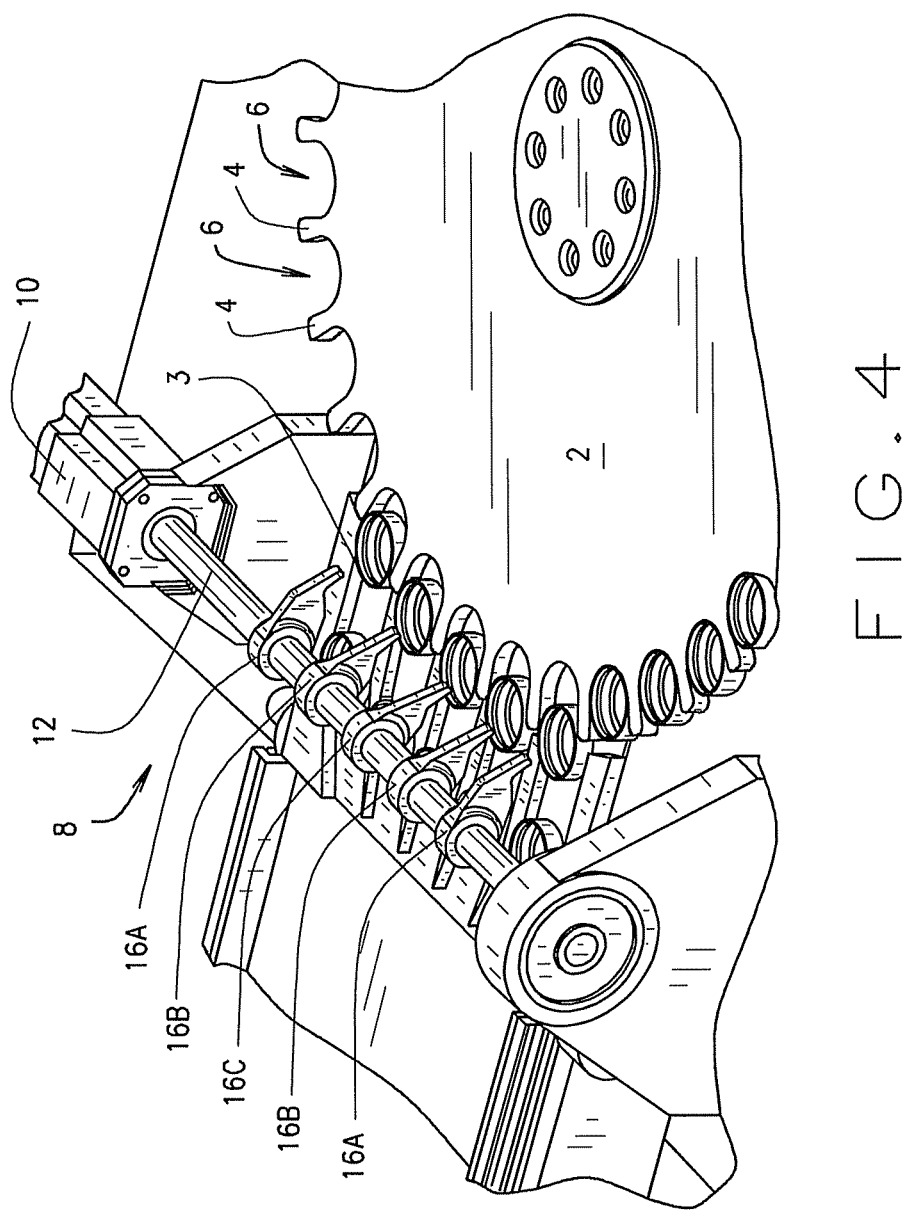
FIG. 4 is a close-up perspective view of the holdback assembly, in which the levers have rotated so as to cease holding back the caps and the star wheel recesses have begun to receive the caps.
Figure 5:
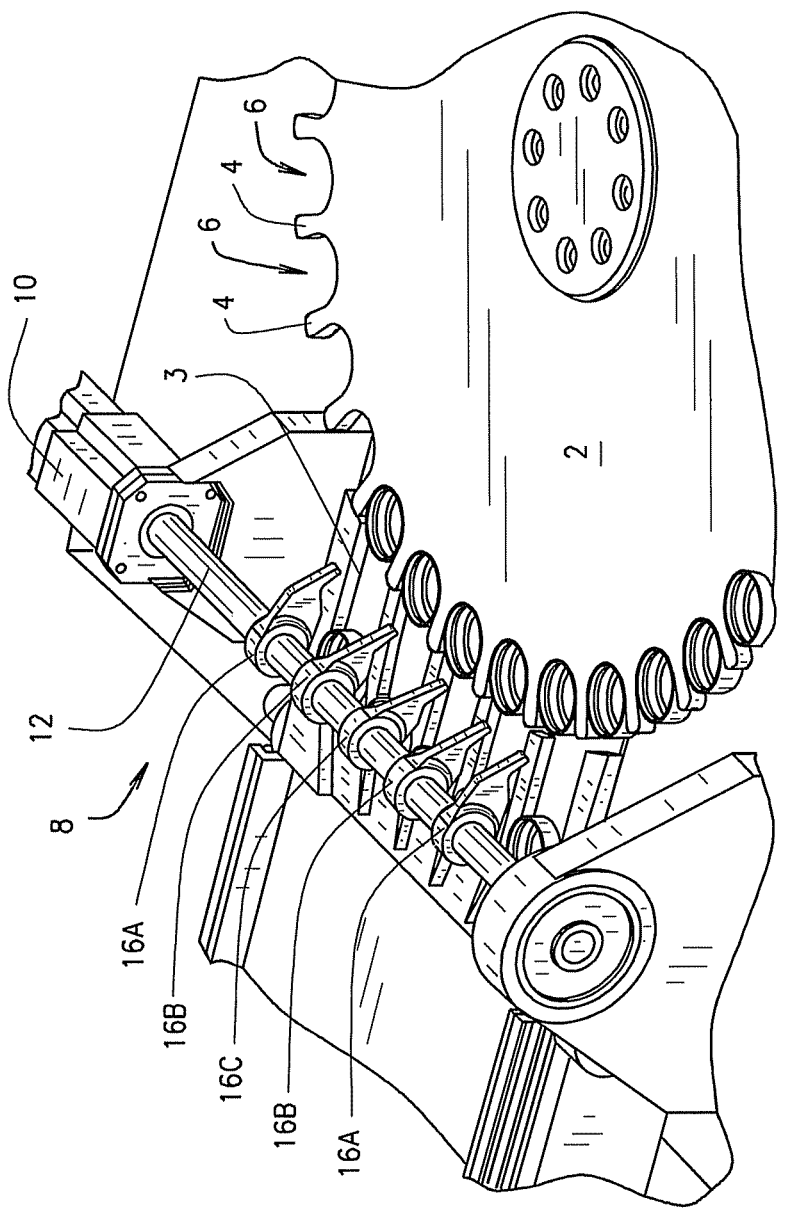
FIG. 5 is a close-up perspective view of the holdback assembly, the star wheel recesses have received the caps, and the next set of caps has begun to move forward in their respective in-feed lanes.

In practice, as shown in FIGS. 2-5, the motor 10, which may be a servo motor or any other suitable type of drive mechanism, whether electric or mechanical (hereinafter "motor"), rotates the rotatable member 12 and the levers 16 connected thereto between a "closed" and an "open" position. In the closed position shown in FIG. 2, the levers 16 have been rotated downwardly into the lanes 14 so as to block the forward progress of caps 3 in their respective in-feed lanes 14. In the open position shown in FIGS. 3-5, the levers 16 have been rotated out of the lanes 14 and no longer block the forward progress of caps 3 in their respective in-feed lanes 14. As such, FIGS. 3-5 illustrate the forward movement of the caps 3 into respective recesses 6 of the star wheel 2 when the holdback assembly 8 is in the open position. In FIG. 5, the row of caps 3 have moved fully forward into the respective recesses 6 of the star wheel 2, and the next row of caps 3 can be seen moving forward as well. At that point, the motor 10 actuates the rotatable member 12—and thereby the levers 16—back into the closed position shown in FIG. 2 so as to hold back the next row of caps 3 while the star wheel 2 rotates the next set of recesses 6 into position to receive the next row of caps 3.

It is noted that when a holdback assembly 8 is used in connection with a component receiving mechanism which is capable of receiving more than one cap 3 from a lane 14 at a time. In such an embodiment, the holdback assembly 8 may remain in the open position while multiple caps 3 pass into the component receiving mechanism from each lane before returning to the closed position.

When the holdback assembly 8 is used in connection with straight pockets or other component receiving mechanism which are not radial, the levers 16 may be positioned in each lane 14 identically to one another such that the caps 3 in the various lanes 14 are held back at generally the same locations in each lane 14. However, when the holdback assembly 8 is used in connection with a star wheel 2, the row of caps 3 being held back by the holdback assembly 8 are preferably held back in a radial pattern along arc 20, as opposed to in a straight line. This can best be seen in FIG. 1. In doing so, the caps 3 in the outer lanes 14A are allowed to move farther forward before being held back in the outer lanes 14A as compared to the caps 3 in the middle lanes 14B or center lane 14C. Similarly, the caps in the middle lanes 14B are allowed to move farther forward in their respective lanes as compared to the cap in the center lane 14C. The radial pattern is designed to roughly correspond to the radial curve of the star wheel 2.

As will be understood, if the caps 3 were to be held back along a straight line, the caps 3 in the outer lanes 14A would be held back at positions farther and farther from the recesses 6 of the star wheel 2 as the lanes progress outwardly from a central point. Once the holdback assembly 8 is opened, the varying distances between the holdback point of the caps 3 in each lane 14 and the respective recesses 6 of the star wheel 2 would therefore require different travel times for the caps 3 traveling forward from the holdback points into the recesses 6. The caps from the more central lanes 14 would therefore be loaded into their respective cap 3, but would have to wait inefficiently as the caps in lanes 14 more toward the ends of the series have yet to be loaded into the star wheel 2. Further, if the caps 3 are to be loaded into the star wheel 2 while the star wheel 2 is in motion, the varying travel distances of the caps can throw off the loading timing, resulting in mis-fed caps 3.

Instead, by allowing the caps 3 to move farther forward in their respective lanes 14 as the lanes 14 move farther from the center of the series of lanes 14, the variance in distance between each cap 3 and its respective recess 6 is reduced. As a result, the time needed for each cap 3 to move forward into its respective recess 6 upon the opening of the holdback assembly 8 becomes more standardized, resulting in lower wait times and lower instances of mis-fed caps 3.

Figure 6:
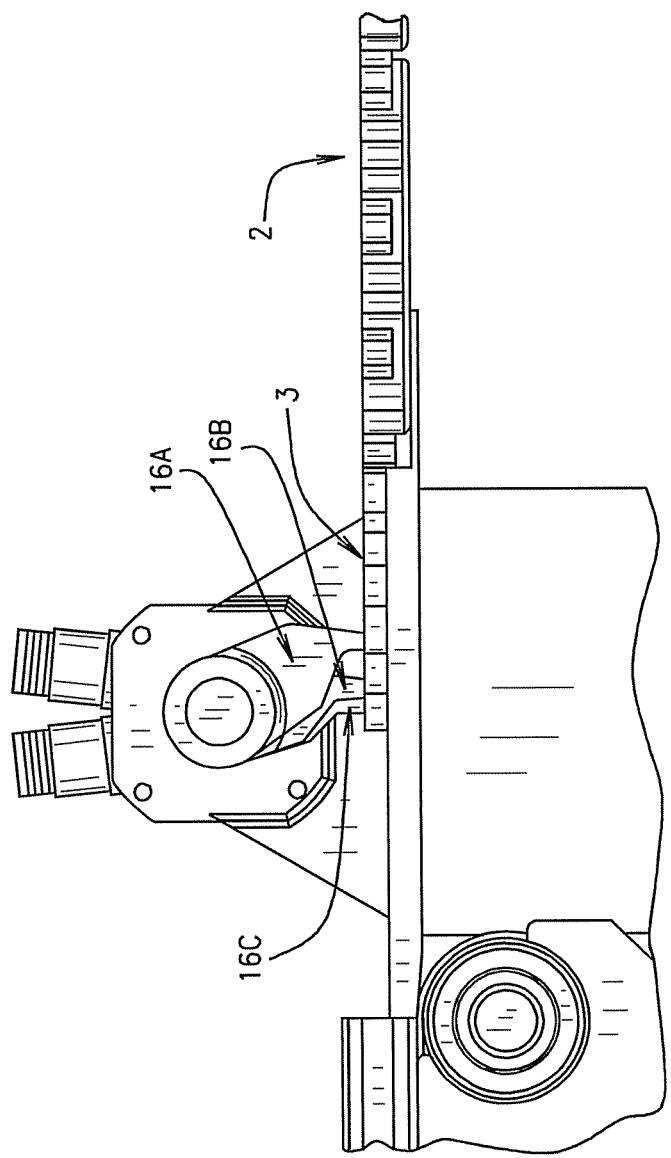
FIG. 6 is a side elevation view of the holdback assembly in the closed position such that caps are held back from the star wheel.
Figure 7:
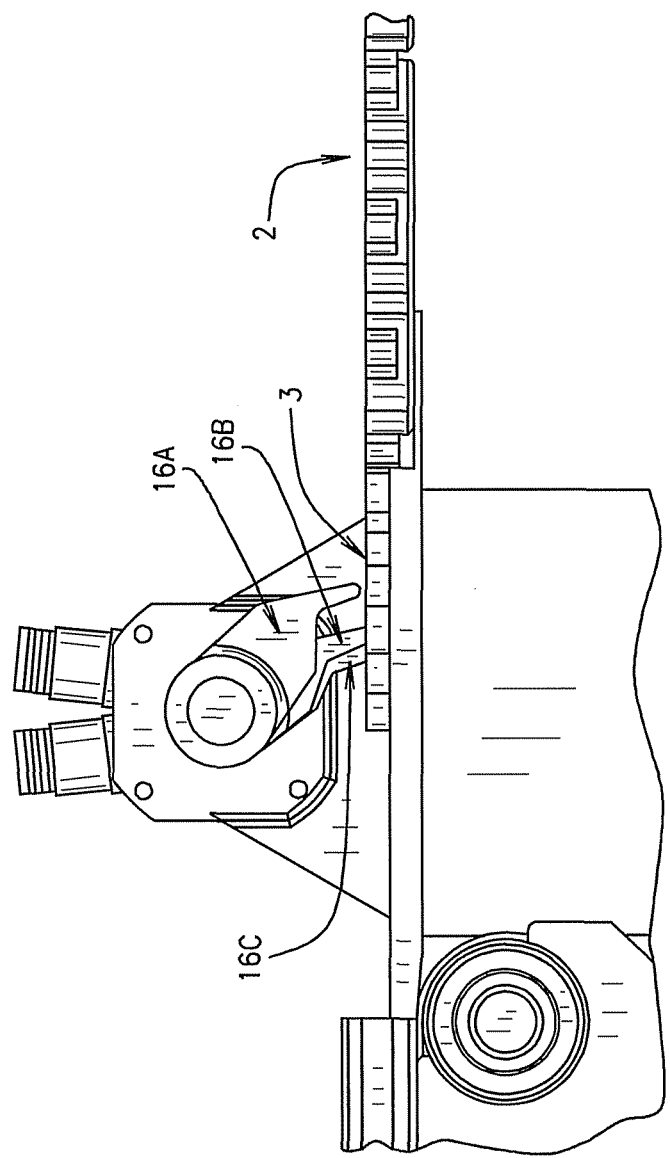
FIG. 7 is a side elevation view of the holdback assembly, in which the levers have begun to rotate to approximately 20°.
Figure 8:
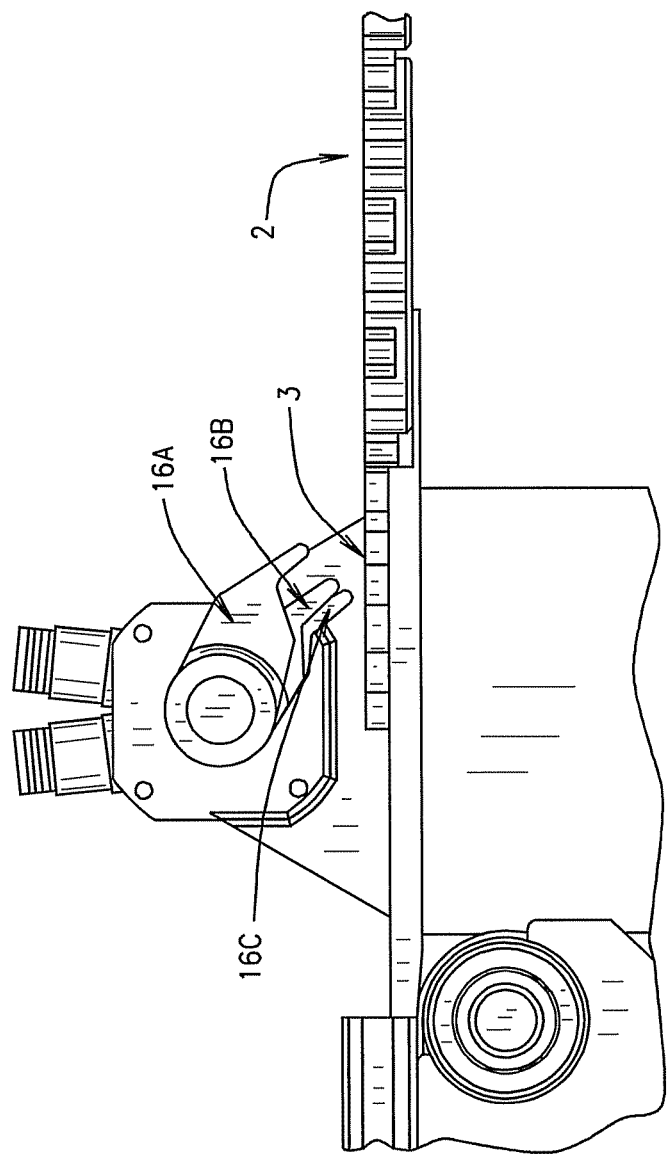
FIG. 8 is a side elevation view of the holdback assembly in the open position (approximately 40° of rotation) such that the caps are no longer held back.

FIGS. 6-8 illustrate side views of the holdback assembly 8 in various stages of operation. FIG. 6 illustrates the holdback assembly 8 in the closed position, in which the levers 16 are holding back the caps 3 from progressing forward toward the star wheel 2. As can be seen, lever 16A is angled so as to hold the caps in its lane 14A at a position farther forward than do levers 16B or 16C. Lever 16C is angled so as to hold the caps in its lane 14C at a position farther back than do levers 16B or 16A. Lever 16B is angled so as to hold the caps in its lane 14B at a position between that of levers 16A or 16C. This creates the radial pattern described above. It is also noted that levers 16B and 16A on the far side of lever 16C are also present, but the view of same is blocked by the levers 16B and 16A closer to the perspective of FIG. 6. The levers 16A and 16B not shown in FIG. 6 similarly hold the caps 3 back in those respective lanes 14A, 14B at positions similar to the visible levers 16B and 16A shown in FIG. 6.

FIG. 7 illustrates the holdback assembly 8 in the midst of a rotation from the closed to open positions (or vice versa). Such a rotation may be approximately 20°. As can be seen, at approximately 20° of rotation, lever(s) 16A may have already released the caps 3 in lanes 14A, while levers 16B and 16C may still be restricting the movement of caps 3 in lanes 14B and 14C. Similarly, it will be understood that with continued rotation, levers 16B would release the caps 3 in lanes 14B prior to the release of caps 3 in lane 14C by lever 16C. Allowing the caps 3 to begin moving in a sequence from the outer lanes to the inner lanes may additionally help correct for varying travel distances/times of caps 3 in different lanes.

As noted above, the arc 20 preferably "roughly corresponds" to the radial curve of the star wheel 2, and therefore is not required to exactly match the radial curve of the star wheel 2. An arc 20 which does not exactly match the radial curve of star wheel 2 would still introduce some travel distance/time variance among caps in the various lanes. Therefore, levers 16 which are positioned and angled to sequentially release the caps 3 according to the travel distance/time needed are preferable in such a situation. However, where an arc pattern 20 is used which exactly mimics the radial curve of the star wheel 2, such varied release times for the caps 3 in varying lanes 14 may not be necessary. Further, varying the angles of the levers 16 may be utilized to vary the timing of the release of caps 3 within lanes even where a star wheel 2 or other radial component receiving mechanism is not used.

FIG. 8 illustrates the holdback assembly 8 in the fully open position, which may be a rotation of approximately 40°, and in any case is sufficient to allow all of the caps 3 in the lanes 14 to proceed forward toward the star wheel 2.

Figure 9:
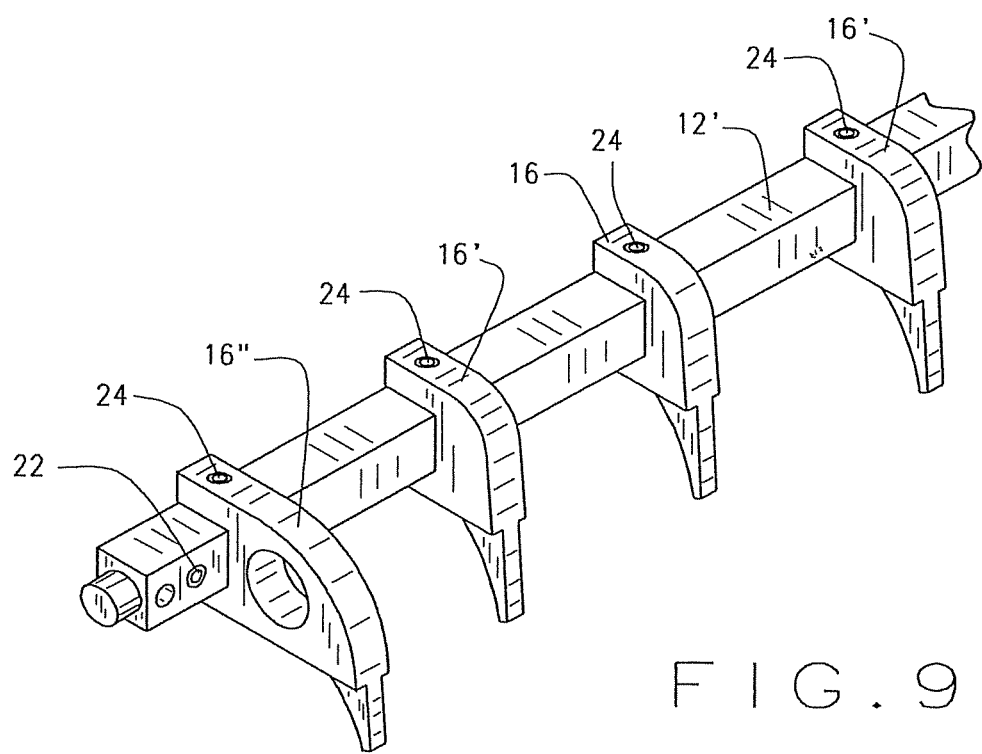
FIG. 9 is a perspective view of another embodiment of the rotatable member and levers, according to the present holdback system.

FIG. 9 illustrates another embodiment of the rotatable member 12', which is generally square in cross-section. At least one end, and preferable both ends of the rotatable member 12' include at least one detent member 22. When installed as part of the holdback assembly 8, the ends of the rotatable member 12' is seated within a carriage member 23 (shown in FIG. 10) having a detent receiving portion (not shown), such that detent member 22 engages with a detent receiving portion to removably secure the rotatable member 12' in place. The detent member 22 allows for securement of the rotatable member 12' as a component of the holdback assembly 8, but also allows for fast and easy removal and replacement of the rotatable member 12'.

FIG. 9 also illustrates levers 16, as well as alternative embodiments of a lever 16' and 16". Rather than using identical levers 16 secured to rotatable member 12 at varying angles, differently sized levers 16-16" may be used. Levers 16-16" may be secured to the rotatable member 12, 12' in any manner. In one embodiment as shown in FIG. 9, rotatable member 12' includes cavities at fixed positions. A pin 24 can thereby be inserted through a lever 16-16" and into a cavity to secure the lever 16-16" in place. However, it is also envisioned that rotatable member 12' may include a plurality of detent receiving areas along its length and that levers 16-16" may include detents, such that the levers 16-16" may be moved substantially anywhere along the rotatable member 12' and secured in place. As discussed above, it will be understood that any other method of securing the levers 16-16" to the rotatable member 12, 12' could be used.

FIG. 10 illustrates additional possible features of the holdback assembly 8. The position of holdback assembly 8 may be adjustable via an adjustment mechanism 30. Adjustment mechanism 30 may include various securement holes 32 at varying locations along the adjustment mechanism 30. A screw, pin, or other such member may thereby be inserted through one or more holes 34 in the holdback assembly and into one or more securement holes 32 in the adjustment mechanism 30. In this way, the holdback assembly 8 may be moved along the adjustment mechanism 30 for proper positioning of levers 16-16" within lanes 14, and secured in place.

Additionally, a guide member 26 having guide slots 28 may be positioned over lanes 14. A lever 16-16" may thereby be rotated into and through a guide slot 28 to perform its holdback function on components 3 in the lane 14 below, but is prevented from deviating from its general positioning. In combination with adjustment mechanism 30, the guide slots 28 allow for fast and easy adjustment of the position of the holdback assembly 8 without the need to adjust the positioning of the levers 16-16" thereafter. The guide member 26 may be clear or otherwise translucent.

FIGS. 11A-11C illustrate an alternative embodiment of the holdback system, in which at least one cam 40 is attached to the rotatable member 12, rather than a lever 16. Each of FIGS. 11A-11C are transverse cross sectional views along the x-y plane. The orientation of rotatable member 12 as shown would be projecting into and out of the drawing sheet. Cam 40 is used to transform rotational movement of the rotatable member 12 into straight-line movement of pin 42. Pin 42 is generally restricted from moving in any direction but vertically, and is biased toward the position shown in FIG. 11A in which it is raised above bed 44 such that components 3 could pass by. Pin 42 may be spring loaded to accomplish such biasing, and may be housed within a sleeve. As the rotatable member 12 begins to rotate (shown in FIG. 11B), the irregular shape of the cam 40 begins to exert a downward force on pin 42. In FIG. 11C, the cam 40 has rotated fully such that pin 42 has been pushed into a fully lowered position in which components 3 would be held back and prevented from passing by. Of course, it is recognized that cams 40 may be of any suitable shape and configuration to transform rotational motion into straight-line motion of a pin 42.

It is noted that such a cam 40 and pin 42 arrangement may be preferable where rotatable member 12 is a flexible and/or curved shaft, such that using levers 16 discussed above is less effective.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A holdback system comprising:
   a component receiving mechanism comprising a star wheel having a plurality of cogs and recesses, each recess being sized and shaped to receive a component therein;
   a plurality of component in-feed lanes, for feeding a plurality of components into the component receiving mechanism;

a holdback assembly including a drive mechanism, a rotatable member and a plurality of levers operatively engaged with the rotatable member, wherein the drive mechanism is operable to selectively rotate the rotatable member to move each lever between an open position and a closed position, wherein rotation of said rotatable member into the closed position causes each lever to be positioned in an in-feed lane so as to hold back a component from being fed into the component receiving mechanism, and wherein rotation of the rotatable member into the open position allows at least one component to be fed from an in-feed lane into the component receiving mechanism.

2. The system of claim 1 wherein the components held back by the levers are aligned in a radial pattern.

3. The system of claim 2 wherein said plurality of in-feed lanes includes at least five in-feed lanes.

4. The system of claim 2 wherein the radial pattern is created by the positioning of the levers in the respective lanes, where the lever in a third lane hold the components in its respective lane the farthest back, and where the levers in a first and a fifth lanes hold the components in their respective lanes the farthest forward, and where the levers in a second and a fourth lanes hold the components in their respective lanes at a position between that of the lever in the third lane and the levers in the first and fifth lanes.

5. The system of claim 1 wherein the drive mechanism is a servo motor.

6. The system of claim 1 wherein the rotatable member is positioned over and across the at least one in-feed lane.

7. The system of claim 6 wherein the levers are suspended above the lanes by the rotatable member, and are positioned to rotate downwardly into the lanes to hold back the components.

8. The system of claim 1 wherein the levers are removably attached to the rotatable member such that rotation of the rotatable member cause said levers to simultaneously rotate.

9. The system of claim 1 wherein the rotatable member and its associated levers are removable and replaceable with a different rotatable member having different associated levers in different positions as compared to the levers on the original rotatable member.

10. The system of claim 1 wherein the rotatable member includes a cam associated with each lever member, where said operative engagement of said rotatable member with said lever entails rotation of the cam to move said lever from the open position into the closed position.

11. The system of claim 10 wherein said rotatable member is flexible and non-linear during operation.

12. The system of claim 1 wherein the position of the holdback assembly is adjustable.

13. The system of claim 1 wherein a guide member having at least one guide slot is located above the at least one in-feed lane, each guide slot allowing a lever to rotate from the open position, through said guide member and into said closed position.

14. A holdback system comprising:

a star wheel having a plurality of cogs and recesses, each recess being sized and shaped to receive therein a component;

a series of component in-feed lanes including in-feed lanes located toward the center of the series and in-feed lanes located toward the ends of the series, each in-feed lane for feeding a said component into a recess of the star wheel;

a holdback assembly including a drive mechanism, a rotatable member, and a plurality of levers attached to the rotatable member such that each said lever is positioned to be rotated into a said in-feed lane to engage with and hold back components in the in-feed lane from being fed into the star wheel, and to be rotated out of said in-feed lane to allow a component in the in-feed lane to be fed into its respective recess of the star wheel;

wherein a lever engaging with components in an in-feed lane which is located toward the center of the in-feed lane series is positioned to hold components further back in the in-feed lane in its closed position as compared with a lever which engages with components in an in-feed lane toward the ends of the in-feed lane series.

15. The system of claim 14, wherein the components which are held back are aligned in a radial pattern.

16. The system of claim 14, wherein the components which are held back are aligned in a straight pattern.

17. The system of claim 14 wherein said series of in-feed lanes includes at least five in-feed lanes, with a third lane being the center lane, a first and a fifth lanes being the lanes at the ends of the series, and a second and a fourth lanes being located between the center and end lanes.

18. The system of claim 14 wherein a radial pattern is created by the positioning of the levers in the respective lanes, where the lever in a third lane hold the components in its respective lane the farthest back, and where the levers in a first and a fifth lanes hold the components in their respective lanes the farthest forward, and where the levers in a second and a fourth lanes hold the components in their respective lanes at a position between that of the lever in the third lane and the levers in the first and fifth lanes.

19. The system of claim 14 wherein the drive mechanism is a servo motor.

20. The system of claim 14 wherein the rotatable member is positioned over and across the in-feed lanes.

21. The system of claim 19 wherein the levers are suspended above the lanes by the rotatable member, and are positioned to rotate downwardly into the lanes to hold back the components.

22. A method of holding back components comprising the steps of:

providing a series of in-feed lanes;

positioning a plurality of levers with respect to said in-feed lanes, each of said levers being selectively rotatable between a closed and open position, into and out of the in-feed lanes, respectively;

selectively rotating each of said levers into a respective in-feed lane to block the progress of components in each said in-feed lane, and adjusting the angle at which levers reside in the in-feed lanes in the closed position, such that a lever positionable within an outer in-feed lane holds components in said outer in-feed lane at a position farther forward in said in-feed lane than does a lever positionable within an inner in-feed lane, said held back components forming a radial pattern.

* * * * *